UNITED STATES PATENT OFFICE.

THOMAS A. ROBINSON, OF LIMA, OHIO, ASSIGNOR TO THE AMERICAN WOOD FIBER COMPANY, OF SAME PLACE.

COMPOSITION OF MATTER FOR WALL-PLASTER.

SPECIFICATION forming part of Letters Patent No. 658,590, dated September 25, 1900.

Application filed June 22, 1900. Serial No. 21,221. (No specimens.)

*To all whom it may concern:*

Be it known that I, THOMAS A. ROBINSON, a citizen of the United States, residing at Lima, in the county of Allen and State of Ohio, have invented new and useful Improvements in Composition of Matter for Wall-Plaster, of which the following is a specification.

This invention relates to a composition of matter for a wall-plaster to be used for plastering walls and ceilings and for other purposes.

It is the object of my invention to produce a plastering compound that shall have the requisite strength, elasticity, and pliability to form a wall-covering that will not crack, scale, or flake off and which will give the most satisfactory results as a wall-covering.

My composition of matter consists of the ingredients combined in the proper proportions hereinafter set forth, the quantities being stated in avoirdupois weight for a ton of two thousand pounds of the composition.

The ingredients of my composition and the preferred quantities are as follows: calcined gypsum, seven hundred pounds; whiting, two hundred pounds; sand, eight hundred pounds; wood fiber, one hundred pounds; cement, one hundred and ninety-eight pounds, and argol, two pounds. I would have it understood, however, that the proportions of these ingredients may be varied to some extent according to circumstances.

The calcined gypsum which I employ as a base for my composition is preferable to any kind of lime or lime in any form in that it unites perfectly with the other ingredients used.

Whiting is another principal and valuable ingredient in my composition of matter, being permanent in the air and insoluble in water. It greatly improves the quality of the composition and is a non-conductor of heat or cold and electricity. It is economical, spreads easily, gives the softness and plasticity much desired in plaster, is permanently adhesive, and undergoes no change after the composition has set.

As a filler I employ sand as being best adapted to my mixture and far superior to clay. The calcined gypsum, whiting, and the cement combine with the sand to produce a wall-covering of great strength and durability and which is capable of resisting decay; also, by reason of its cheapness the use of sand permits the production of a plastering composition that is comparatively inexpensive and which may be made and sold in competition with ordinary mortar, a very important consideration in the manufacture of plaster.

I employ wood fiber as a binder in preference to hair and all other fibrous materials heretofore used, it being a very light and bulky material and capable of greatly increasing the covering capacity of the plaster. It also makes the composition tough, elastic, and flexible or pliable, and gives to it the many known valuable properties of the wood itself, besides rendering the plaster almost indestructible from the effects of hard usage. It also imparts to the plaster such qualities as will make it permanently adhere to brick, stone, or lathing, whether of wood or metal.

The cement should be used in such proportion as will cause the composition to properly set or harden when applied, the rapidity of the setting to be varied or controlled by using more or less of the argol, which I employ as a retarder, thus producing a hard and practically waterproof surface. Cement made from marl, Portland cement, or natural cement will answer the required purpose in my composition of matter.

All the materials of my composition are in harmony with each other in the production of a cheap, reliable, and very durable plastering compound. When mixed with a proper quantity of water to make ready for use, they will undergo chemical changes, making a plaster that will harden with age and never show disintegration. This plaster will remain upon the walls firm and solid and free from cracks. It is very light, which is an important requisite of a plaster. It is easily and cheaply made, and when sacked it may be shipped conveniently and will retain its qualities in a manufactured condition for a long time, being always ready for use by simply adding water until the composition is soft enough to work easily.

What I claim as my invention is—

1. The herein-described composition of matter to be used as a wall-plaster, consisting of calcined gypsum, whiting, sand, wood fiber, cement and argol, substantially as described.

2. The herein-described composition of matter to be used as a wall-plaster, consisting of seven hundred pounds of calcined gypsum, two hundred pounds of whiting, eight hundred pounds of sand, one hundred pounds of wood fiber, one hundred and ninety-eight pounds of cement, and two pounds of a retarder, substantially as described.

3. The herein-described composition of matter to be used as a wall-plaster, consisting of calcined gypsum, whiting, sand, wood fiber, cement and a retarder.

In testimony whereof I have hereunto set my hand in presence of two subscribing witnesses.

THOMAS A. ROBINSON.

Witnesses:
CHESTER E. REYNOLDS,
D. A. McCOMB.